United States Patent [19]
Krause et al.

[11] 3,954,604
[45] May 4, 1976

[54] SIFTING MACHINE

[75] Inventors: Rudolf Krause, Dornholzhausen; Günter Erlenstaedt, Remscheid, both of Germany

[73] Assignee: "Rhewum" Rheinische Werkzeug- u. Maschinenfabrik GmbH, Remscheid-Luttringhausen, Germany

[22] Filed: Aug. 9, 1971

[21] Appl. No.: 169,931

[30] Foreign Application Priority Data
Aug. 7, 1970  Germany............................ 2039335
Mar. 16, 1971 Germany............................ 2112577

[52] U.S. Cl................................ 209/325; 209/346; 209/365 R
[51] Int. Cl.²......................................... B07B 1/30
[58] Field of Search........... 209/365 R, 365 A, 325, 209/329, 346, 309, 310, 326, 367, 368, 344, 339; 74/61; 198/220 DB, 220 DC

[56] References Cited
UNITED STATES PATENTS

| | | | |
|---|---|---|---|
| 1,397,906 | 11/1921 | Ruprecht | 209/368 |
| 1,491,432 | 4/1924 | Stebbins | 209/346 X |
| 1,999,673 | 4/1935 | Weber | 209/329 X |
| 2,058,870 | 10/1936 | Mazle | 209/365 A X |
| 2,062,529 | 12/1936 | Sahut | 209/326 |
| 2,062,529 | 12/1936 | Sahut | 209/326 |
| 2,112,886 | 4/1938 | Greenawalt | 209/346 X |
| 2,120,032 | 6/1938 | Mess | 209/332 X |
| 2,222,299 | 11/1940 | Parks | 209/365 B X |
| 2,333,338 | 11/1943 | Rapp | 209/368 X |
| 2,395,138 | 2/1946 | Nicholls | 209/325 X |
| 2,402,340 | 6/1946 | Parmenter | 209/326 |
| 2,453,883 | 11/1948 | Weitlaufer | 209/326 X |
| 2,706,112 | 4/1955 | Carrier | 209/365 B X |
| 3,087,617 | 4/1963 | Forsberg | 209/414 X |
| 3,330,411 | 7/1967 | Erlenstädt | 209/368 X |

FOREIGN PATENTS OR APPLICATIONS

| | | | |
|---|---|---|---|
| 38,913 | 5/1886 | Germany | 209/326 |
| 518,185 | 2/1940 | United Kingdom | 209/310 |
| 674,923 | 7/1952 | United Kingdom | 209/310 |
| 851,300 | 7/1952 | Germany | 209/365 R |
| 1,041,332 | 10/1958 | Germany | 209/329 |
| 972,488 | 7/1959 | Germany | 74/61 |

OTHER PUBLICATIONS

Chen. Eng's Handbook, Perry, 1965, 21–48.
Class 209, Classifying, Separating, and Assorting Solids, Jan. '52.

*Primary Examiner*—Robert Halper
*Attorney, Agent, or Firm*—Spencer & Kaye

[57] ABSTRACT

A sifting machine having vibration generators connected to the opposite ends of a sieve screen, the vibration generators being so constructed as to vibrate one end of the sieve screen at a relatively low frequency and a relatively high amplitude and to vibrate the other end of the sieve screen at a relatively high frequency and a relatively low amplitude.

8 Claims, 8 Drawing Figures

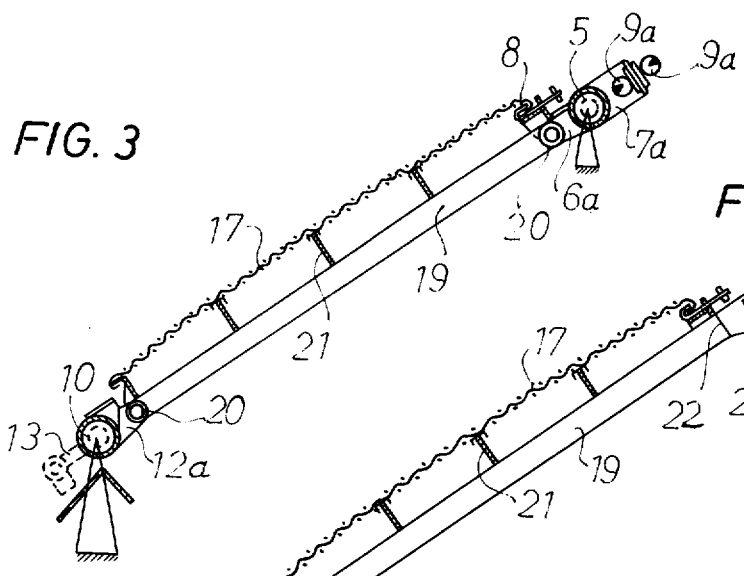
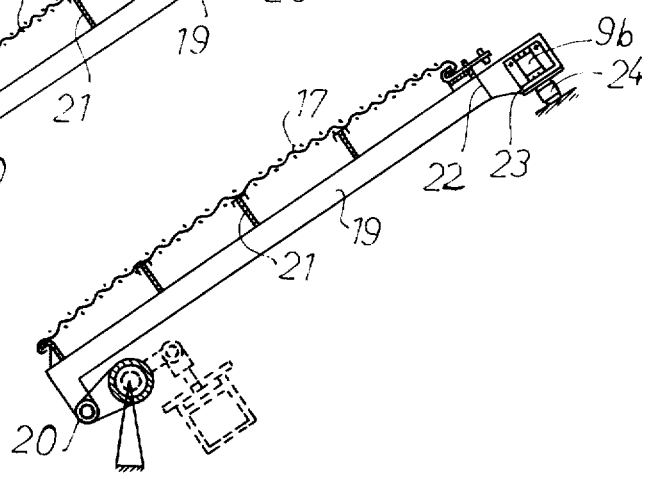
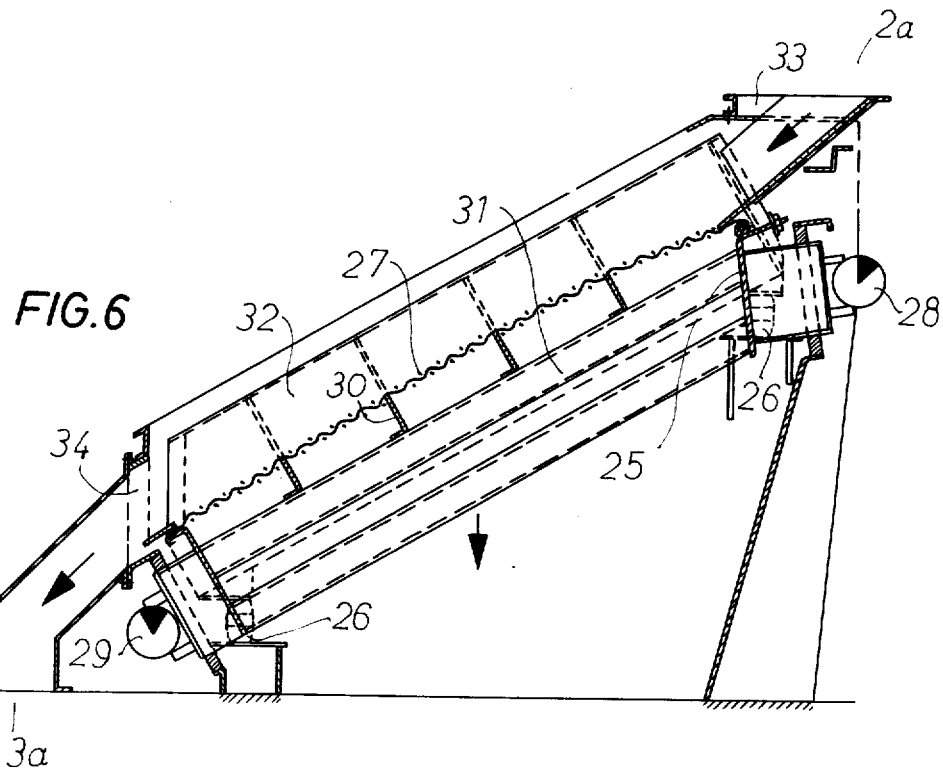

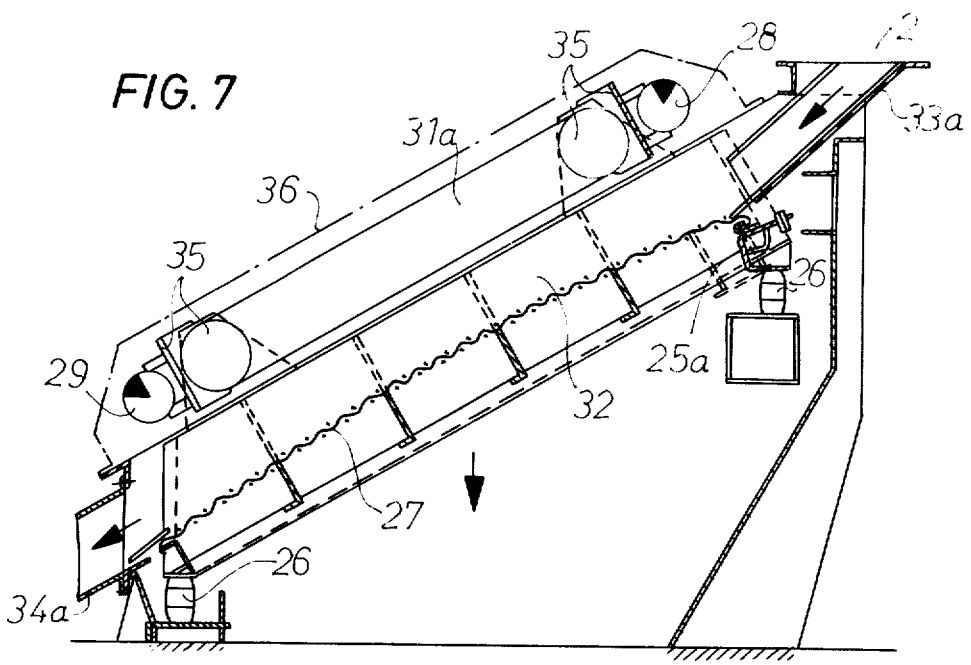
FIG. 7
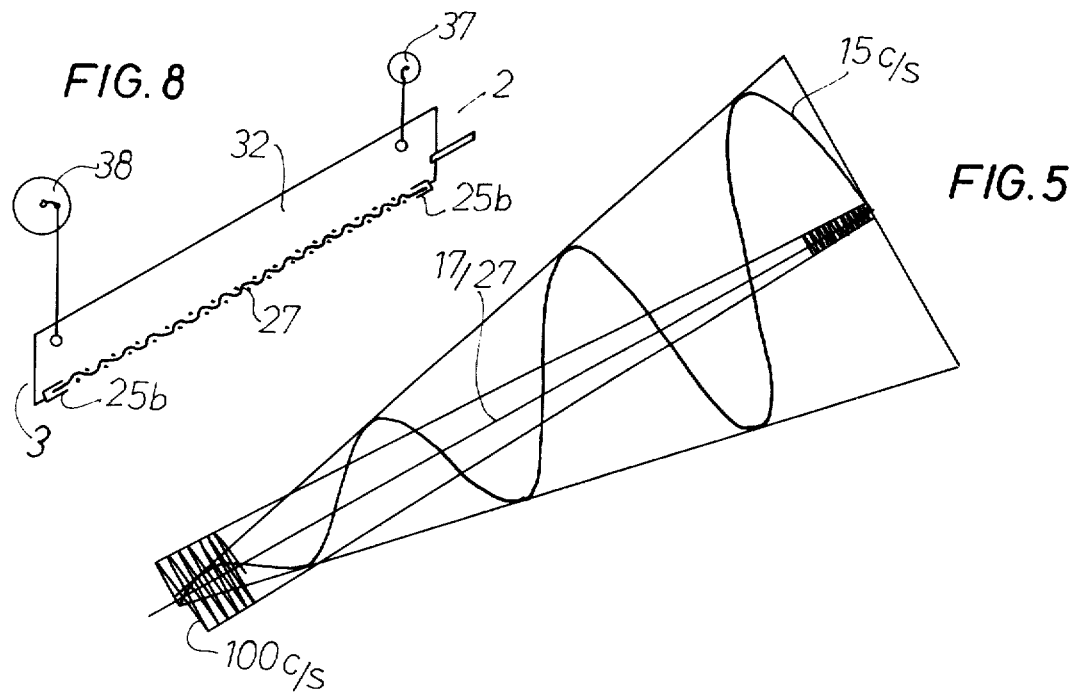
FIG. 8
FIG. 5

SIFTING MACHINE

BACKGROUND OF THE INVENTION

This invention relates to a sifting machine having a sieve screen which can be caused to vibrate by vibration generators.

Among the known sifting machines of this type which are constructed in the form of vibrating or swinging sieves, there exists the drawback that the vibrations acting on the sieve screen are uniform and offer no possibilities for variation except in intensity. Since the energy imparted by the vibration generators generally acts on the material to be sifted as a reciprocable pushing sifting movement, in conformance with the classical sifting movement, the separating effect is often unsatisfactory.

SUMMARY OF THE INVENTION

It is the object of this invention to improve the sifting effect of the above described type of sifting machine and to adapt the sifting machine to the different behavior of the material to be sifted resulting from different grain structures, pouring angles, dampness, etc.. This is accomplished by vibrating one end of the sieve screen at a relatively low frequency and a relatively high amplitude and vibrating the other end of the sieve at a relatively high frequency and a relatively low amplitude.

BRIEF DESCRIPTION OF THE DRAWING

FIG. 3 is a side elevation of a part of a second embodiment of the sifting machine.

FIG. 4 is a side elevation of a part of a third embodiment of the sifting machine.

FIG. 5 is a schematic representation of the vibrations imparted to the sieve screen.

FIGS. 6 through 8 are side elevations of three further embodiments of the sifting machine.

DESCRIPTION OF THE PREFERRED EMBODIMENTS

Figure 1:
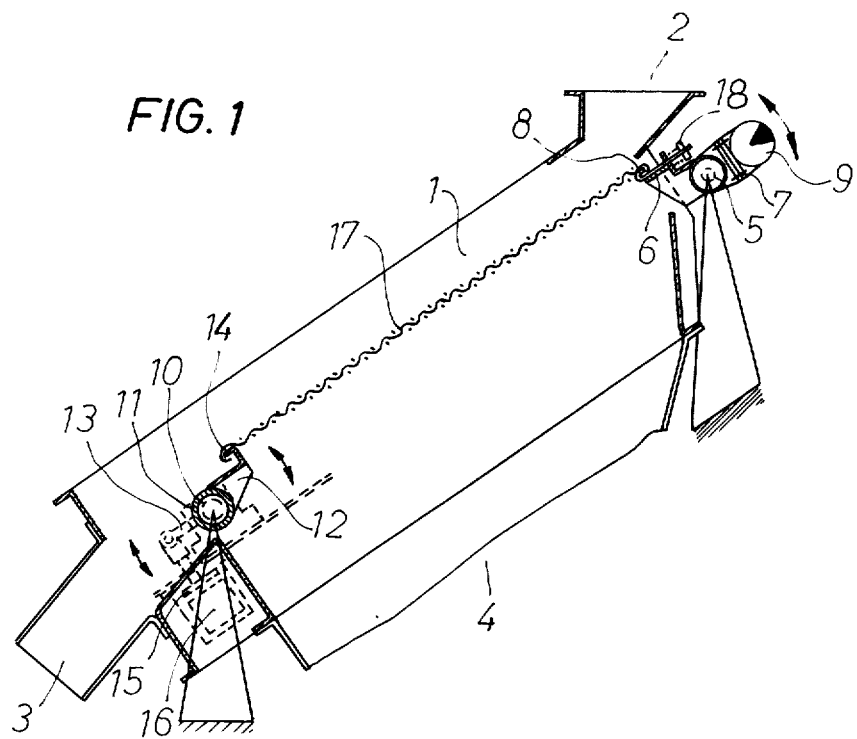
FIG. 1 is a sectional side elevation of one embodiment of the sifting machine.
Figure 2:
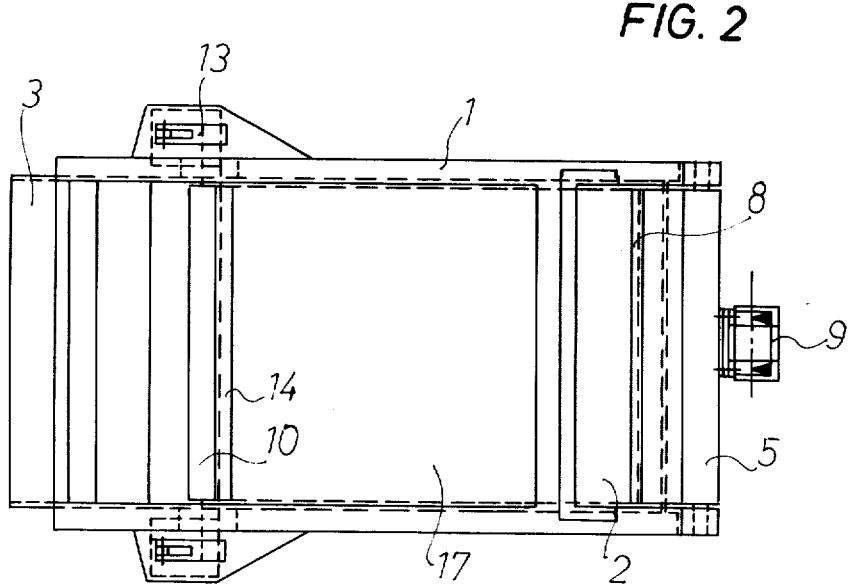
FIG. 2 is a plan view of the machine of FIG. 1.

In the sifting machine of FIGS. 1 and 2, the side walls 1 of a stationary sieve box of the machine have extending therebetween an inlet 2 for the unsifted material, an outlet 3 for the unsifted material, an outlet 4 for the sifted material, and a shaft 5 under the inlet 2. The shaft is mounted in rubber bearings so as to have limited displacement. Two oppositely disposed lever arms 6, 7 are fixedly attached to the shaft 5. The lever arm 6 extends into the sieve box and has a clamping bar 8 mounted thereto. The other lever arm 7 has a motor 9 mounted thereto that bears an eccentric mass, this type of motor being hereinafter referred to as an eccentric motor.

A shaft 10 is mounted in rubber bearings 11 in the side walls 1 of the sieve box in the vicinity of the outlet 3. The shaft 10 has fixed thereto oppositely disposed lever arms 12,13. The lever arm 12, which extends into the sieve box, has a clamping bar 14 mounted thereto, while the lever arm 13 is hingedly connected to the armature 15 of an electromagnet 16 (linear vibrator) which is fastened to the sieve box.

The ends of a sieve screen 17 are mounted to the clamping bars 8,14 in such a manner that the sieve screen is inclined. A spring 18 yieldably mounts the clamping bar 8 to the lever 6 so that the clamping bar 8 may yieldably move toward the clamping bar 14 during the operation of the sifting machine to compensate for the tensions generated during this operation. The sieve screen is not supported along its longitudinal sides.

The eccentric motor 9 and the electromagnet 16 are so disposed that the levers 6, 12 apply force components to the sieve screen 17 that are perpendicular to the plane of the sieve screen.

The eccentric motor 9 produces, via lever arms 6,7 of shaft 5, vibrations at a relatively low frequency (e.g. 15 c/s (Hz)) which have a relatively high amplitude and which act on the sieve screen 17 adjacent the inlet 2. These vibrations extend from the inlet 2 toward the outlet 3 and are dampened by the sieve screen 17.

The armature 15 of the electromagnet 16 produces vibrations on the sieve screen 17 adjacent the outlet 3, via the lever arms 12,13 of the shaft 10, at a relatively high frequency (e.g. 50 c/s(Hz) or 100 c/z(Hz)). These vibrations are of relatively low amplitude and move toward the inlet area 2 and die out after being dampened.

The two types of vibrations produced by the eccentric motor 9 and the electromagnet 15 on the sieve screen 17 are superimposed one on the other so that rapid impulses are imparted by the sieve screen to the material to be sifted in a vertical direction. This is illustrated schematically in FIG. 5.

According to this Figure, at the left or lower end of the screen 17 or 27 there is imparted a vibration of relatively high frequency (100 c/s in this case) and of relatively small amplitude. This sinusoidal vibration of the screen gradually dampens towards the right until, at the right or upper end of the screen, the amplitude of the screen vibration (caused by the vibration imparted at the left end of the screen) attains a minimum value. At the right or upper end of the screen 17 or 27 there is imparted a vibration of relatively low frequency (15 c/s in this case) and a relatively large amplitude. This sinusoidal vibration of the screen gradually dampens towards the left until, at the left or lower end, the amplitude of the screen vibration (caused by imparting a vibration at the right end of the screen) attains a minimum value. It is noted that the resultant screen vibration obtained from the superposition of the two vibrations is not illustrated.

In the machine of FIG. 3, the sieve screen, which is mounted to and between the clamping bars 8 and 14, is supported by a frame 19. Crossbars at the opposite ends of the frame 19 are pivotally connected with lever arms 6a, 12a of shafts 5,10, preferably in rubber bearings 20. Struts 21 are disposed on the frame 19 widthwise of and below the sieve screen 17. The struts 21 support the sieve screen so that it bows outwardly to a limited extent against the weight of the material to be sifted. Thus the distance between the sieve screen 17 and the frame 19 is greater at the center than at the longitudinal ends of the sieve screen. The eccentric drive at the inlet end of the sieve screen is produced by two eccentric motors 9a which operate in synchronism to displace the sieve screen transversely of its surface.

In the machine of FIG. 4, an eccentric motor 9b, which is fixedly connected to a transverse bar 22 of the frame 19 that is located in the vicinity of the inlet 2, acts on the sieve screen 17 in a direction that is at right angles to its surface. The housing 23 of the motor 9b is mounted on rubber springs 24 which in turn are supported on a stationary surface as, for example, the sieve box.

In the machine of FIG. 6, a rectangular sieve frame 25 rests on four rubber springs 26 located in each corner of the sieve frame. A sieve screen 27 is mounted to the sieve frame 25 only at the longitudinal ends adjacent the inlet 2a and the outlet 3a for the unsifted material. Eccentric motors 28,29 are connected to the outer ends of short extensions of the sieve frame 25, the eccentric masses of the motors 28 and 29 rotating about axes which are parallel to each other and to the sieve frame extensions. The motor 28 rotates at approximately 1500 r.p.m. and is so constructed that the amplitude of vibration of the sieve frame in the vicinity of the inlet 2a is approximately 6–8 mm. The eccentric motor 29 rotates at approximately 3000 r.p.m. and is so constructed that the amplitude of vibration of the sieve frame 25 in the vicinity of the outlet 3a is approximately 2 mm. The sieve screen 27 is supported by transverse struts 30 and is inclined to the horizontal by about 30°. A rigid longitudinal strut 31, in the form of a pipe, is located below the sieve screen and is supported at its ends by the sieve frame extensions. Along its longitudinal edges, the sieve screen 27 is confined by skirts 32 that are fastened to the sieve frame 25. An inlet trough 33 and an outlet trough 34 are formed on a structural unit that is mounted to the machine base separately and independently from the sieve frame 25.

The sifting machine shown in FIG. 7 is similar to the machine of FIG. 6, but in the FIG. 7 machine the eccentric motors 28 and 29 are located above the sieve screen 27 and are so disposed that they do not extend longitudinally beyond the short extensions of the sieve frame box 25a. In this machine, the skirts 32 are bridged by crossties 35. A longitudinal strut 31a extends between the crossties.

In both the machines of FIG. 6 and of FIG. 7, a covering hood 36 is provided, as indicated in dot-dash lines in FIG. 7.

In the sifting machine of FIG. 8, the sieve frame 25b is so mounted as to be suspended and inclined and is caused to vibrate by means of two crank drives 37 and 38 which have different crank lengths and which rotate at different speeds.

The above described sifting machines effect an improvement of sifting generally and enable their adaption to the different behaviors of the material to be sifted resulting from different grain structures, pouring angles, dampness, etc.

From the foregoing it can be seen that at least one vibration generator is arranged to engage the sieve screen or sieve frame in the vicinity of the inlet for the unsifted material and at least one vibration generator is arranged to engage the sieve screen or sieve frame in the vicinity of the outlet for the unsifted material, the frequencies of these vibration generators being different and the amplitudes imparted to the sieve screens being inverse to that of the frequencies. It is preferable that the frequencies imparted at the inlet and outlet have a ratio of approximately 1 to 2 and that the amplitudes imparted at the inlet and outlet have a ratio of approximately 3 to 1. It is within the purview of the invention, however, to have the higher frequencies and lower amplitudes at the inlet. This has the advantage that the two different frequencies are impressed on the material to be sifted during the sifting operation. The frequencies, which are applied from the different generators at the different rates, have different amplitudes and are superimposed on each other so that the material is well loosened with rapid impulses to provide a separating effect heretofore unattainable. This effect is enhanced by having the vibration generators impart different intensities with respect to each other which are preferably variable in the same manner as the frequencies and/or amplitudes.

The spring 18, shown in FIG. 1, may also be used to yieldably mount the clamp bar 14 to the lever 12 and may also be used to yieldably mount the longitudinal ends of the sieve screen 17 in the machines of FIGS. 3 and 4.

In the machines of FIGS. 1 and 3, the sieve screen 17 is inclined in the conveying direction extending from the inlet 2 to the outlet 3. The sieve screen is longer in the conveying direction than in the direction transverse thereto and is caused to vibrate at its ends, the vibration being produced by vibration generators 9 or 9a in the form of eccentric motors and the vibration generators 16 in the form of electromagnets that impart motion to the longitudinal ends of the sieve screen 17 or to the sieve frame 19. The sieve screen 17 is yieldably held or mounted only at the front and rear of the inclined surface by means of the springs 18. The bars 8,14 which mount and support the sieve screen are respectively on the ends of lever arms 6 or 6a and 12 or 12a which are respectively fixedly connected with shafts 5 and 10. The shafts 5 and 10 are respectively located at fixed locations in, for example, the stationary sieve box adjacent the front and rear of the sieve screen, but are rotatably in bearings that may be, for example, made of rubber. One or more lever arms 7 or 7a is fixedly secured to the shaft 5 to extend away from the shaft 5 oppositely from the lever arms 6 or 6a and one or more lever arms 13 is fixedly secured to the shaft 10 to extend away from the shaft 10 oppositely from the lever arms 12 or 12a. The lever arms 7 and 7a carry vibration generators in the form of the eccentric motors 9 and 9a and the lever arms 13 are pivotally connected with vibration generators in the form of stationary electromagnets 16. With this arrangement, substantially vertical impulses are imparted to the inclined sieve screen to permit variable adaptation to diverse sifting conditions through the selection of the vibration generators and their frequencies and intensities.

As stated above the eccentric motor 9 imparts a relatively low frequency, e.g. 15 c/s(Hz), to the shaft 5 and thus to the inlet end or front of the inclined sieve screen 17 while the armature 15 moved by the electromagnet 16 imparts a relatively high frequency, e.g. 50 c/s(Hz) or 100 c/s(Hz) to the shaft 10 and thus to the outlet end or rear of the inclined sieve screen 17. This arrangement causes long stroke vibrations of high amplitude to become effective vertically of the sieve screen at its inlet end, the vibrations become increasingly dampened as they progress toward the outlet end of the sieve screen. The mass of material being sifted also decreases as it progresses toward the outlet end of the sieve screen since it is being sifted through the screen. The outlet end of the sieve screen 17 receives vibrations of relatively high frequencies (e.g. 50 c/s (Hz) or 100 c/s (Hz) which impart low amplitudes to the outlet end of the sieve screen that extend vertically of the sieve screen and which diminish as they progress toward the inlet end. The closer the material to be sifted moves toward the outlet end, the more forceful become the vibrations imparted to the sieve screen, these vibrations being augmented by the high frequency oscillations imparted by the armature 15 of the electromagnet 16, thus enabling all the desired material to be sifted. The vibration waves move against each other and superimpose themselves on the sieve screen 17 so that a rapid impulse of vibrations are obtained on the sieve screen which leads to a very large separation of the material to be sifted and a high effectiveness of movement of that material to be sifted passing through the sifting screen.

In the machines of FIGS. 1 and 3 the shafts 5 and 10 are mounted in rubber bearings so as to have limited displacement in the side wall 1 of the sieve box, the sieve box having the inlet 2 for the unsifted material, the outlet 3 for the unsifted material and the outlet 4 for the sifted material. The shaft 5 is located in front of and below the inlet 2 and the shaft 10 is located in the vicinity of the outlet 3. The shafts 5 and 10 are provided with lever arms 6 or 6a and 12 or 12a which extend toward each other and carry the clamping bars 8 and 14. The sieve screen 17 extends between the clamping bars and is fastened at its front and rear to the clamping bars. The lever arms 7 or 7a on the inlet end of the sieve carries the eccentric motor 9 or the eccentric motors 9a while the lever arms 12 or 12a on the outlet end of the sieve is pivotally connected to the armature 15 of the electromagnet 16. The electromagnet 16 is fastened to the sieve box so that its armature 15 operates in a direction that is at right angles to the plane of the sieve screen. The sieve screen 17, at its inlet end, is yieldably held by the spring 18. The sieve screen, which is not held or supported at its sides, thus receives at its inlet end, where the sifting material is being applied thereto, a movement which is identical to the movement of the eccentric motor or motors about the shaft 5 so that the sieve screen begins to vibrate at the frequency of the eccentric motor or motors. At the outlet end of the sieve screen 17, the frequency of the electromagnet 16 is transferred to the shaft 10 from the freely movable armature, through the lever arm 13 pivoted to the armature, and from the shaft 10 to the sieve screen via the lever arm 12.

In the machine of FIG. 3, the sieve screen 17 is supported by the frame 19 whose crossbars are connected with the lever arms 7a and 12a by the rubber bearings 20. The slight transverse stresses occurring at the bearings of the shafts 5 and 10 and at the bearings 20 by the swinging movement of the lever arms 6a and 12a are absorbed by the rubber bearings which require no maintenance.

In the machine of FIG. 4, the frame 19 is used as the support for the sieve screen 17. The transverse bar 22, of the frame 19 is fixedly connected adjacent the inlet end of the sieve screen with one vibrator generator in the form of the eccentric motor 9b or with a plurality of such motors moving synchronously. The motor or motors produce a movement on the sieve screen that is perpendicular thereto. The housing 23 of the motor or motors is resiliently mounted on the rubber supports or springs 24 which are supported on a stationary surface such as the sieve box. With this arrangement, the vertical component of movement of the vibration generators is transferred directly to the transverse bar 22 of the frame 19 and from the frame to the sieve screen 17.

In the machine of FIGS. 3 and 4, the frame 19 is provided with struts 21 that are disposed transversely below the sieve screen 17. These struts, in addition to supporting the sieve screen, divide the sieve screen into transverse sections that extend lengthwise of the sieve screen and thus divide the sieve screen into different vibration zones. The vibrations emanating from the vibration generators 9a or 9b and 16 are also imparted by the struts 21 along the length of the sieve screen because the frame 19 also has vibrations imparted thereto by the vibration generators.

When sifting dry material, it is desirable that the vibration generators which are located adjacent the inlets for the unsifted material operate at the relatively low frequency and high amplitude while the vibration generators adjacent the outlets for the unsifted material operate at the relatively high frequency and low amplitude.

For sifting damp material it is preferred that the vibration generators adjacent the inlets for the unsifted material operate at the relatively high frequency and low amplitude and that the vibration generators adjacent the outlets for the unsifted material operate at the low frequency and high amplitude.

The machines of FIGS. 6 and 7, which are simple and robust in construction and are so constructed that the sieve screens 27 may readily be replaced, have the sieve frames 25 and 25a mounted on the machine frame by the rubber springs 26 so that the sieve frames are insulated against vibrations. The vibration generators 28,29 are secured to the sieve frames 25 or 25a.

In the machine of FIG. 7, the vibration generators 28, 29 are located above the sieve screen 27 and within the confines of the frame 25a. This makes it possible to arrange a plurality of sifting devices in close proximity one behind the other and to combine them into an assembly of sifting devices that take up a relatively small amount of space.

A further advantage of the machines of FIGS. 6 and 7 in that the inlet troughs 33 and 33a and the outlet troughs 34 and 34a are mounted indpendently of the sieve frames 25 and 25a.

It will be understood that the above description of the present invention is susceptible to various modifications, changes and adaptations, and the same are intended to be comprehended within the meaning and range of equivalents of the appended claims.

We claim:

1. A sifting machine, comprising in combination:
    a. a rectangular sieve screen having a first end and a second end, the length of the sieve screen being greater than its width, said length extending between said first and second ends, said sieve screen being inclined in a direction extending downwardly from said first end toward said second end;
    b. a first vibration generator operatively connected to said first end, said first vibration generator having means for imparting a vibration of relatively low frequency and relatively high amplitude to said first end in a direction having a component perpendicular to the plane of said sieve screen;
    c. a second vibration generator operatively connected to said second end, said second vibration generator having means for imparting a vibration of relatively high frequency and relatively low amplitude to said second end in a direction having a component perpendicular to the plane of said sieve screen;
    d. a first clamp located at the first end of the sieve screen to which said first end is mounted;

e. a second clamp located at the second end of the sieve screen to which said second end is mounted;

f. a first rotatably mounted shaft located adjacent the first clamp and said first vibration generator;

g. a second rotatably mounted shaft located adjacent the second clamp and said second vibration generator;

h. a first lever arm fixedly attached to the first shaft and connected to the first clamp;

i. a second lever arm fixedly attached to the second shaft and connected to the second clamp;

j. spring means connected to at least one of said clamps for providing relative yielding movement of the clamps toward each other;

k. a third lever arm fixedly attached to the first shaft and extending therefrom oppositely from said first lever arm and connected to said first vibration generator; and l. a fourth lever arm fixedly attached to the second shaft and extending therefrom oppositely from said second lever arm and connected to said second vibration generator.

2. The sifting machine as defined in claim 1 wherein said first end is the inlet end of the sieve screen and said second end is the outlet end of said sieve screen; wherein said first vibration generator comprises an eccentric motor mounted to said third lever arm; wherein said second vibration generator comprises an electromagnet having an armature operatively connected to said fourth lever arm; and further comprising: means operating the eccentric motor so as to impart a relatively low frequency to said third lever arm; and means operating the electromagnet so as to cause the armature to impart a relatively high frequency to said fourth lever arm.

3. The sifting machine as defined in claim 1 wherein said first end is the inlet end of said sieve screen and said second end is the outlet end of said sieve screen and further comprising: a sieve box having a pair of spaced side walls, the sieve box containing an inlet for the sifting material located adjacent said first end of the sieve screen, an outlet for the unsifted material located forwardly of the inlet beyond said second end of the sieve screen, and an outlet for the sifted material located below the sieve screen; means mounting the shafts, which extend between the side walls, for rotation in rubber bearings in the side walls so as to have limited displacement therein; and wherein said first vibration generator comprises an eccentric motor mounted to said third lever arm and said second vibration generator comprises an electromagnet fastened to the sieve box having an armature extending at right angles to the sieve screen, and means pivotally connecting the armature to the fourth lever arm.

4. The sifting machine as defined in claim 1 further comprising: a frame; crossbars at the opposite ends of the frame; a first rubber bearing pivotally connecting one of the crossbars to the first lever arm; and a second rubber bearing pivotally connecting the other of the crossbars to the second lever arm.

5. The machine as defined in claim 1 wherein said first end is the inlet end of the sieve screen and said second end is the outlet end of said sieve screen.

6. A sifting machine, comprising in combination:

a. a sieve screen having a first end and a second end;

b. a first vibration generator operatively connected to said first end, said first vibration generator having means for imparting a vibration of relatively low frequency and relatively high amplitude to said first end in a direction having a component perpendicular to the plane of said sieve screen;

c. a second vibration generator operatively connected to said second end, said second vibration generator having means for imparting a vibration of relatively high frequency and relatively low amplitude to said second end in a direction having a component perpendicular to the plane of said sieve screen;

d. a first clamp located at the first end of the sieve screen to which said first end is mounted;

e. a second clamp located at the second end of the sieve screen to which said second end is mounted;

f. a first rotatably mounted shaft located adjacent the first clamp and said first vibration generator;

g. a second rotatably mounted shaft located adjacent the second clamp and the second vibration generator;

h. a first lever arm fixedly attached to the first shaft and connected to the first clamp;

i. a second lever arm fixedly attached to the second shaft and connected to the second clamp;

j. a third lever arm fixedly attached to the first shaft and extending therefrom oppositely from said first lever arm and connected to said first vibration generator; and k. a fourth lever arm fixedly attached to the second shaft and extending therefrom oppositely from said second lever arm and connected to said second vibration generator.

7. A sifting machine, comprising in combination:

a. a rectangular sieve screen having a first end and a second end, the length of the sieve screen being greater than its width, said length extending between said first and second ends, said sieve screen being inclined in a direction extending downwardly from said first end toward said second end, said first end being the inlet end of the sieve screen and said second end being the outlet end of the sieve screen;

b. a first vibration generator operatively connected to said first end, said first vibration generator having means for imparting a vibration of relatively low frequency and relatively high amplitude to said first end in a direction having a component perpendicular to the plane of said sieve screen;

c. a second vibration generator operatively connected to said second end, said second vibration generator having means for imparting a vibration of relatively high frequency and relatively low amplitude to said second end in a direction having a component perpendicular to the plane of said sieve screen;

d. one of said vibration generators being an eccentric motor;

e. a first clamp located at the first end of the sieve screen and being attached thereto;

f. a second clamp located at the second end of the sieve screen and being attached thereto;

g. spring means connected to at least one of said clamps for providing relative yielding movement of the clamps toward each other;

h. a frame including means for mounting said clamps thereto adjacent said screen ends and i. a transverse bar on said frame, said eccentric motor being fixedly connected to said transverse bar.

8. The sifting machine as defined in claim 7 further comprising: struts on the frame disposed transversely below the sieve screen.

* * * * *